United States Patent
Kaji

[19]

[11] Patent Number: 6,046,869
[45] Date of Patent: Apr. 4, 2000

[54] INFORMATION RECORDING AND/OR REPRODUCING APPARATUS HAVING A HEAD MOUNTED ON A TRANSVERSELY MOVABLE FILM GUIDE PLATE

[75] Inventor: Toshikazu Kaji, Kanagawa, Japan

[73] Assignee: Fuji Photo Film Co., Ltd., Kanagawa, Japan

[21] Appl. No.: 08/299,128

[22] Filed: Sep. 2, 1994

[30] Foreign Application Priority Data

Sep. 6, 1993 [JP] Japan .................................. 5-220907

[51] Int. Cl.$^7$ ...................................................... G11B 5/00
[52] U.S. Cl. ................................................................ 360/1
[58] Field of Search ........................................ 360/1, 2, 3

[56] References Cited

U.S. PATENT DOCUMENTS

| | | | |
|---|---|---|---|
| 3,319,051 | 5/1967 | Renold ........................................ | 360/3 |
| 5,005,031 | 4/1991 | Kelbe .......................................... | 360/1 |
| 5,041,933 | 8/1991 | DeMarti, Jr. et al. ...................... | 360/3 |
| 5,285,325 | 2/1994 | Kiesow ....................................... | 360/3 |
| 5,400,200 | 3/1995 | Bloemendaal et al. .................... | 360/3 |
| 5,430,512 | 7/1995 | Itoh et al. ................................... | 360/1 |

FOREIGN PATENT DOCUMENTS 4-123054  4/1992  Japan .

*Primary Examiner*—Aristotelis M. Psitos
*Assistant Examiner*—James L Habermehl
*Attorney, Agent, or Firm*—Sughrue, Mion, Zinn, Macpeak & Seas, PLLC

[57] ABSTRACT

In an information recording and reproducing apparatus which conveys a film in which one of a magnetic recording portion and an optical recording portion is provided while guiding the film by a conveying guide and which causes a magnetic or optical head to follow an end surface of the film in a transverse direction thereof, which fishtails, when a portion of at least one edge following surface which abuts a side edge of the film constantly slides on a straight-line portion of the side edge of the film, the relative positional relationship between the one of the magnetic recording portion and the optical recording portion and the magnetic or optical head can be maintained in a fixed state even when the edge following surface passes over a concave portion formed on the side edge of the film. Further, recording or reading of one of magnetic information and optical information can be correctly effected and also the film is not damaged.

8 Claims, 14 Drawing Sheets

INFORMATION RECORDING AND/OR REPRODUCING APPARATUS HAVING A HEAD MOUNTED ON A TRANSVERSELY MOVABLE FILM GUIDE PLATE

BACKGROUND OF THE INVENTION

1. Field of the Invention

The present invention relates to an information recording and reproducing apparatus for guiding and conveying a film to which a magnetic or optical recording portion is provided by a conveying guide and for recording or reading information on or from the magnetic or optical recording portion by a reading/recording means corresponding to the magnetic or optical recording portion.

2. Description of the Related Art

In recent years, a system has been called for in which a magnetic recording portion (i.e., a recording track) is provided in a photographic film. Necessary or effective information, e.g., a photographing date, a title, the number of prints, and print size, is recorded on the magnetic recording portion at the time the camera is photographing or at the time the film is accepted at a so-called photo processing shop for processing. The recorded information is effectively used at the time of printing in a film processing laboratory.

With this system, as illustrated in FIG. 8, a magnetic head 100 is mounted to a piece of laboratory equipment with in a film processing laboratory. Magnetic information recorded on a recording track 104 which is located outside a screen of a film 102 (i.e., outside an image frame) is read by causing the magnetic head 100 to slide on the recording track 104 when the film 102 is conveyed.

On the other hand, in a transport apparatus for conveying the film 102, a conveying guide 106 is used which guides both end portions of the film 102 in a transverse direction thereof. The distance between both ends of the conveying guide 106 in a transverse direction thereof is made a little greater than the transverse dimension of the film 102, thereby improving the passing property of the film 102.

In this case, this dimensional difference between the film 102 and the conveying guide 106 causes the film 102 to move in a zigzag direction when the film 102 is conveyed. It should be noted that the zigzag movement of the film 102 has no influence upon the detection of notches, an ordinary printing processing, or the like.

However, since the strength of a read signal becomes small (i.e., the read signal deteriorates) by a slight change of the relative positional relationship between the magnetic head 100 and the recording track 104, it is necessary to provide means for preventing the relative positional relationship between the magnetic head 100 and the recording track 104 from changing even if the film 102 moves in the zigzag direction.

Accordingly, a magnetic head following system has been conventionally used so as to minimize deterioration of the read signal. This magnetic head following system is constructed such that a guide plate 108 to which the magnetic head 100 is fixed is provided in a cut-off portion of the conveying guide 106 in such a manner that the guide plate 108 can move close to and apart from the film 102, and the guide plate 108 is urged against a side edge of the film 102 by an urging force of an urging means 110.

Since the guide plate 108 follows the film 102 moving in the zigzag direction by means of the urging force of the urging means 110, the relative positional relationship between the magnetic head 100 and the recording track 104 can be kept substantially in a fixed state.

However, in the above-described magnetic head following system, the guide plate 108 is constantly urged against the side edge of the film 102. For this reason, when large stepped or concave portions (for example, a notch 102A, a joint portion 114 using a splicing tape 112, and the like) are formed on the side edge of the film 102, the guide plate 108 may move along these stepped portions (see FIG. 9).

Since the film 102 is conveyed at a high speed, when the guide plate 108 suddenly falls into the notch 102A or the guide plate 108 comes out from the notch 102A, the magnetic head deviates largely from the recording track 104. As a result, the magnetic information cannot be correctly read. Further, when the stepped portions which narrow largely in the transverse direction of the film 102 is formed, the film 102 itself may be damaged.

Further, the transverse dimension of the film may be reduced in the joint portion 114. Accordingly, deviation of the magnetic head 100 and the guide plate 108 becomes even larger.

SUMMARY OF THE INVENTION

In view of the aforementioned, an object of the present invention is to provide an information recording and reproducing apparatus which, when the magnetic head is moved in a transverse direction thereof as the film moves (i.e., moved in accordance with the displacement of the transverse direction end portion of the film), can maintain the relative positional relationship between the magnetic head and a recording track in a fixed state even if stepped portions such as a notch and a joint portion are formed in the film.

In accordance with a first aspect of the present invention, there is provided an information recording and reproducing apparatus which conveys a film in which a magnetic or optical recording portion is provided while guiding the film by a conveying guide and which records or reads information on or from the magnetic or optical recording portion by reading/recording means corresponding to the magnetic or optical recording portion, comprising: a guide plate on which said reading/recording means is mounted, said guide plate being capable of moving close to or away from a side edge of the film and having one edge following surface which abuts said side edge of the film; and urging means which urges the edge following surface of said guide plate in a direction in which the edge following surface abuts said side edge of the film and which causes said guide plate to follow the film which is fishtailing, wherein a dimension of said edge following surface in a direction in which the film is conveyed is larger than a dimension of the width of openings of concave portions formed in said side edge of the film.

In accordance with a second aspect of the present invention, there is provided an information recording and reproducing apparatus in the first aspect, wherein said guide plate cannot rotate in a fishtailing direction of said reading/recording means corresponding to said magnetic or optical recording portion.

In accordance with a third aspect of the present invention, there is provided an information recording and reproducing apparatus which conveys a film in which a magnetic or optical recording portion is provided while guiding the film by a conveying guide and which records or reads information on or from the magnetic or optical recording portion by reading/recording means corresponding to the magnetic or optical recording portion, comprising: a guide plate on which said reading/recording means is mounted, said guide plate being capable of moving close to or away from a side edge of the film and having two edge following surface which abut said side edge of the film; and urging means which urges the edge following surfaces of said guide plate in a direction in which the edge following surface abuts said side edge of the film and which causes said guide plate to follow the film which is fishtailing, wherein, on the basis of a dimension of the width of openings of concave portions formed on said side edge of the film and/or a distance between adjacent concave portions along a direction in which the film is conveyed, a dimension of each of said two edge following surfaces in the direction in which the film is conveyed and/or a distance between said two edge following surfaces in the direction in which the film is conveyed is determined, and at least a portion of at least one of said two edge following surfaces is caused to slide on a straight-line portion of said side edge of the film.

In accordance with a fourth aspect of the present invention, there is provided an information recording and reproducing apparatus in the third aspect, wherein said guide plate cannot rotate in a fishtailing direction of said reading/recording meals corresponding to said magnetic or optical recording portion.

In accordance with the first aspect, since the dimension of the edge following surface in a direction in which the film is conveyed is made larger than the dimension of an opening of the concave portion (e.g., a notch, a concave portion comprised of a stepped portion formed by connecting films by a splicing tape), the edge following surface is not hung up in the stepped portion. Further, since at least a portion of the edge following surface slides on the side edge of the film, the edge following surface can reliably follow the film moving in the zigzag direction.

In accordance with the second aspect, the guide plate can move only in a direction perpendicular to the side edge of the film. In other words, the guide plate cannot rotate in a fishtailing direction of the reading/recording means corresponding to the magnetic or optical recording portion (i.e., a direction in which a certain portion of the reading/recording means moves close to the side edge of the film in a state in which the reading/recording means is fixed to a point on a longitudinal line of the film within the reading/recording means). For this reason, even if a portion of the guide plate corresponds to the stepped portion, the guide plate can reliably follow the film which is fishtailing direction without being influenced by the stepped portion so long as the other portion of the guide plate slides on the straight-line portion of the film.

In accordance with the third aspect, two edge following surfaces are provided on the guide plate. On the basis of the dimension of the concave portion formed in the side edge of the film and the distance between adjacent concave portions, the dimension of the edge following surface in the direction in which the film is conveyed, and the distance between the two edge following surfaces are determined such that at least one edge following surface slides on the straight-line portion of the side edge of the film.

As a first example, notches formed in the photographic film at even intervals is considered. In this case, the distance from one edge following surface to another edge following surface is made greater than the dimension of an opening of the concave portion formed on the side edge of the photographic film, and the distance between the two edge following surfaces is made shorter than the distance of the straight-line portion of the photographic film between adjacent stepped portions. As a result, the two edge following surfaces are adapted to stride across the stepped portion, or to be both positioned on the straight-line portion between the adjacent stepped portions. Thus, at least one portion of at least one edge following surface can slide on the straight-line portion of the film side edge.

As a second example, a joint portion (whose dimension in the direction in which the film is conveyed is large) for connecting two films, and a notch portion (whose dimension in the direction in which the film is conveyed is small) provided in a leading end portion of the film, are considered. In this case, the following conditions are considered.

(1) The distance from one edge following surface to another edge following surface including the dimensions of the two edge following surfaces is made larger than the distance from the joint portion to the notch portion including open widthwise dimensions of the joint portion and the notch portion.

(2) The distance from one edge following surface to another edge following surface including the dimensions of the two edge following surfaces; is made larger than the dimension of an opening between the edges of the joint portion, and the dimension of one of the edge following surfaces in the direction in which the film is conveyed (this edge following surface is disposed on the side of the notch portion with respect to the joint portion) is made larger than the dimension of the notch portion in the direction in which the film is conveyed.

(3) The distance from one edge following surface to another edge following surface including the dimensions of the two edge following surfaces is made larger than the dimension of an opening between the edges of the joint portion, and the distance between the edge following surfaces is made smaller than the distance between the joint portion and the notch portion.

When the guide plate is formed such that any one of the above-described conditions is concluded, one portion of at least one edge following surface is necessarily adapted to slide on the straight-line portion of the photographic film.

As a third example, a case in which respective intervals between notches formed in the two photographic films, including the joint portion for connecting the two films, are different from each other is considered. In this case, the following conditions are considered.

(1) The dimension of each edge following surface in the direction in which the film is conveyed is made larger than the dimension of the openings between the edges of the joint portion whose dimension is the largest of all of the concave portions.

(2) The distance from one edge following surface to another edge following surface including the dimensions of the two edge following surfaces is made larger than the dimension of an opening between the edges of the largest joint portion, and the distance between the edge following surfaces is made shorter than the distance between the notches whose interval has the shortest distance.

(3) The distance from one edge following surface to another edge following surface including the dimensions of the two edge following surfaces is made larger than the distance from one of adjacent notches whose interval has the longest distance, to another thereof including open widthwise dimensions of the two adjacent notches.

When the guide plate is formed such that any one of the above-described conditions is concluded, one portion of at least one edge following surface is necessarily adapted to slide on a straight-line portion of the photographic film.

In accordance with the fourth aspect, since the guide plate cannot rotate in a fishtailing direction of the reading/recording means corresponding to the magnetic or optical recording portion (i.e., a direction in which a certain portion of the reading/recording means moves in close to the side edge of the film in a state in which the reading/recording means is fixed to a point on a longitudinal line of the film within the reading/recording means), even if one portion of the guide plate corresponds to the stepped portion, the guide plate can reliably follow the film which is fishtailing without being influenced by the stepped portion so long as the other portion of the guide plate slides on the straight-line portion of the film.

As described above, the information recording and reproducing apparatus has an excellent effect in that, in a case in which the magnetic head follows the end surface of the film in the transverse direction thereof, which fishtails, even if the concave portions (stepped portions) such as a notch and a joint portion, are formed in the film, the relative positional relationship between the magnetic head and the recording track can be constantly maintained, thereby correctly recording or reading magnetic information, and preventing the film from being damaged even if a large concave portion (stepped portion) is formed in the film.

DESCRIPTION OF THE PREFERRED EMBODIMENTS (First Embodiment)

Figure 1:
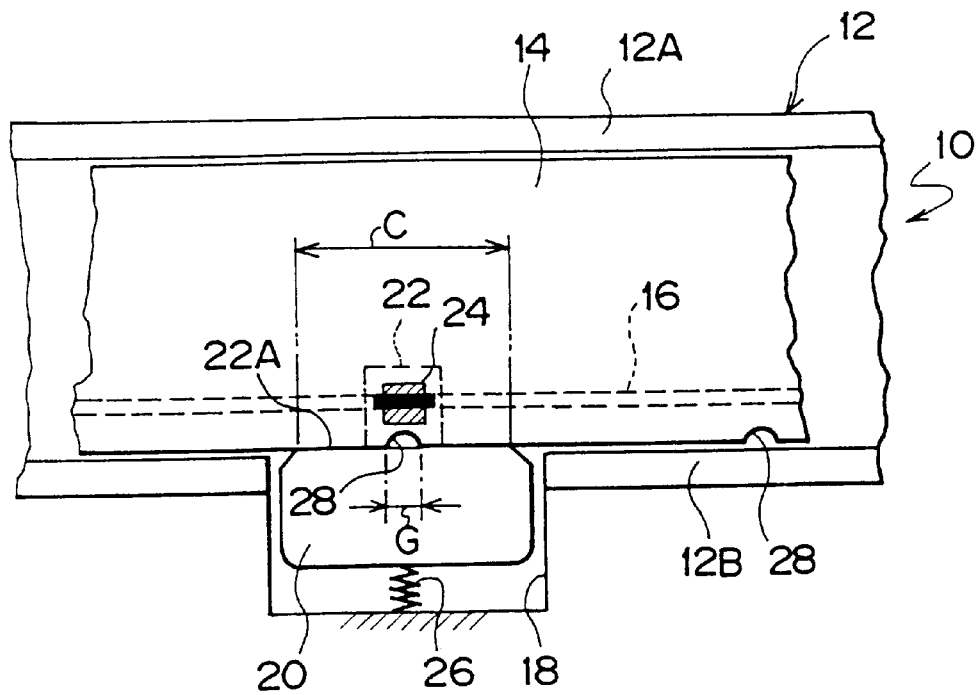
FIG. 1 is a plan view illustrating a portion of a film conveying apparatus according to a first embodiment of the present invention.

FIG. 1 shows a portion of a film conveying apparatus 10 which effects printing processing in a film processing laboratory or the like. A conveying guide 12 is provided in the film conveying apparatus 10. Side wall portions 12A, 12B are uprightly provided on the side edge portions of the conveying guide 12. The film 14 is adapted so as to pass between the side wall portions 12A, 12B. When the film 14 passes therebetween, the film 14 is conveyed substantially in a straight line because both edge surfaces of the film 14, in the transverse direction thereof, are respectively guided along the inner surfaces of the side wall portions 12A, 12B.

Here, the distance between the inner surfaces of side wall portions 12A and 12B is formed slightly larger than the transverse dimension of the film 14. For this reason, the film 14 does not get hung up on the side wall portions 12A, 12B, but instead is smoothly conveyed.

A recording track 16 is provided in one end portion of the film 14 in the transverse direction thereof (on the side of the wall portion 12B). The recording track 16, which is formed of a magnetic body, is adapted to magnetically record necessary (or useful) information at the time the camera is photographing or at the time the film is accepted at a photo processing shop for processing.

A rectangular-shaped notch portion 18 is formed in one portion of the side wall portion 12B. A guide plate 20 is accommodated within the notch portion 18. The guide plate 20 within the notch portion 18 is provided in such a manner as to contact and move away from a side edge of the film 14. An extending portion 22 is formed at one portion of the surface of the guide plate 20 which faces the film 14 (i.e., on a front side of the guide plate 20), and extends to a rear side of a transport path of the film 14.

A magnetic head 24 is mounted to a leading end portion of the extending portion 22 in such a manner as to face the surface of the film 14. The magnetic head 24 is disposed so as to face the above-described recording track 16 and is brought into a state of sliding on the recording track 16 when the film 14 is conveyed.

Further, an end portion of a compression coil spring 26 is fixed to the surface of the guide plate 20, which is opposite to the surface on which the extending portion 22 is formed, i.e., a back surface of the guide plate 20. The other end portion of the compression coil spring 26 is mounted on a bottom surface of the notch portion 18. For this reason, the guide plate 20 is adapted such that the above-described front side of the guide plate 20 (i.e., the surface of the guide plate 20 on which the extending portion 22 is formed) is urged in a direction for contacting the side edge of the film 14 via an urging force of the compression coil spring 26 (the front side of the guide plate 20 will be hereinafter referred to as an edge following surface 22A).

While the film 14 is being conveyed, the film 14 may fishtail to a certain extent due to the difference between the transverse dimension of the film and the distance between the side wall portions 12A, 12B of the conveying guide 12. The edge following surface 22A follows the film 14 which is fishtailing due to the influence of the compression coil spring 26 such that the relative positional relationship between the guide plate 20 and the film 14 may be constantly maintained in a fixed state.

The widthwise dimension C of the edge following surface 22A, which is disposed along a direction in which the film is conveyed, is larger than a width G of a notch 28 formed in the end portion of the film 14 in the transverse direction thereof (C>G). For this reason, even if the edge following surface 22A corresponds to the notch 28 when the edge following surface 22A follows the film 14 which is fishtailing, the edge following surface 22A is not caught in the notch 28 and moves along a line connecting both edges of the notch 28 (an extension line of the side edge of the film 14).

It should be noted that, since the guide plate 20 (including the extending portion 22 and the magnetic head 24) moves only perpendicularly with respect to the side edge of the film 14, the guide plate 20 does not rotate in a fishtailing manner.

Next, an operation of the present embodiment will be described.

The film 14 is corveyed between the side wall portions 12A, 12B of the conveying guide 12 while being guided by each inner surface of the side wall portions 12A, 12B.

Accordingly, since the film 14 can be conveyed substantially in a straight line, the positioning of the film or the like, can be correctly effected during printing processing.

Further, when the film 14 is conveyed, information recorded on the recording track 16 is read by the magnetic head 24, and new information is recorded thereon, so that required information or information useful for processing can be obtained.

On the other hand, the distance between the side wall portions 12A, 12B is set slightly larger than the transverse dimension of the film 14. For this reason, the film 14 does not get hung up on the side wall portions 12A, 12B, but instead is smoothly conveyed. The film 14 fishtails by an amount of the dimensional difference. However, the amount to which the film 14 fishtails is small, and thus does not exert any influence on the positioning of the film for printing processing or the like. On the contrary, when the information on the recording track 16 is read and recorded (written) by the magnetic head 24, the strength of a signal deteriorates due to the change of the relative positional relationship between the magnetic head 24 and the recording track 16, which is caused by the fishtail movement of the film.

Accordingly, in the present embodiment, since the magnetic head 24 is mounted to the extending portion 22 of the guide plate 20 and the guide plate 20 is urged in a direction of the side edge of the film by the urging force of the compression coil spring 26, the edge following surface 22A follows the film 14 which is fishtailing. As a result, the guide plate 20 is moved, so that the relative positional relationship between the magnetic head 24 and the recording track 16 does not change and the magnetic head 24 can be correctly positioned on the recording track 16.

Figure 2:
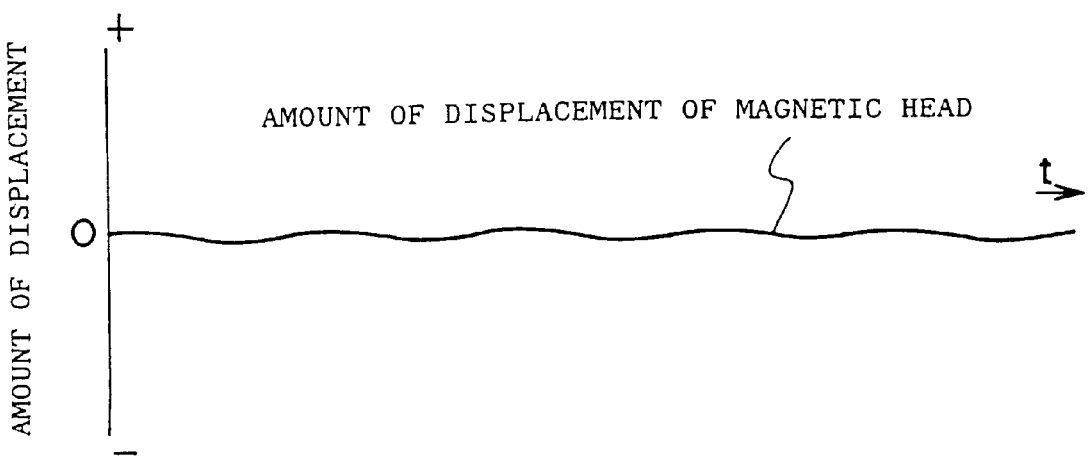
FIG. 2 is a characteristic view illustrating a change in the amount of displacement of a magnetic track.

Further, in the present embodiment, the widthwise dimension C of the edge following surface 22A of the guide plate 20 is larger than the dimension G of the opening of the notch 28 formed in the film 14. For this reason, even if the notch 28 is formed in the film surface which the guide plate 20 follows, the edge following surface 22A can be moved along the extension line of the side edge of the film 14 without causing it to be hung up in the notch 28. Accordingly, as shown in FIG. 2, it is possible to match the amount of displacement of the magnetic head 24 to that of the film 14 (which is caused by the fishtail movement of the film 14) and improve reliability of the edge following surface.

In addition, it is possible to remove a conventional drawback in that the film 14 is damaged by the sudden movement of the guide plate 20 when the guide plate 20 is hung up in the notch 28.

Figure 3:
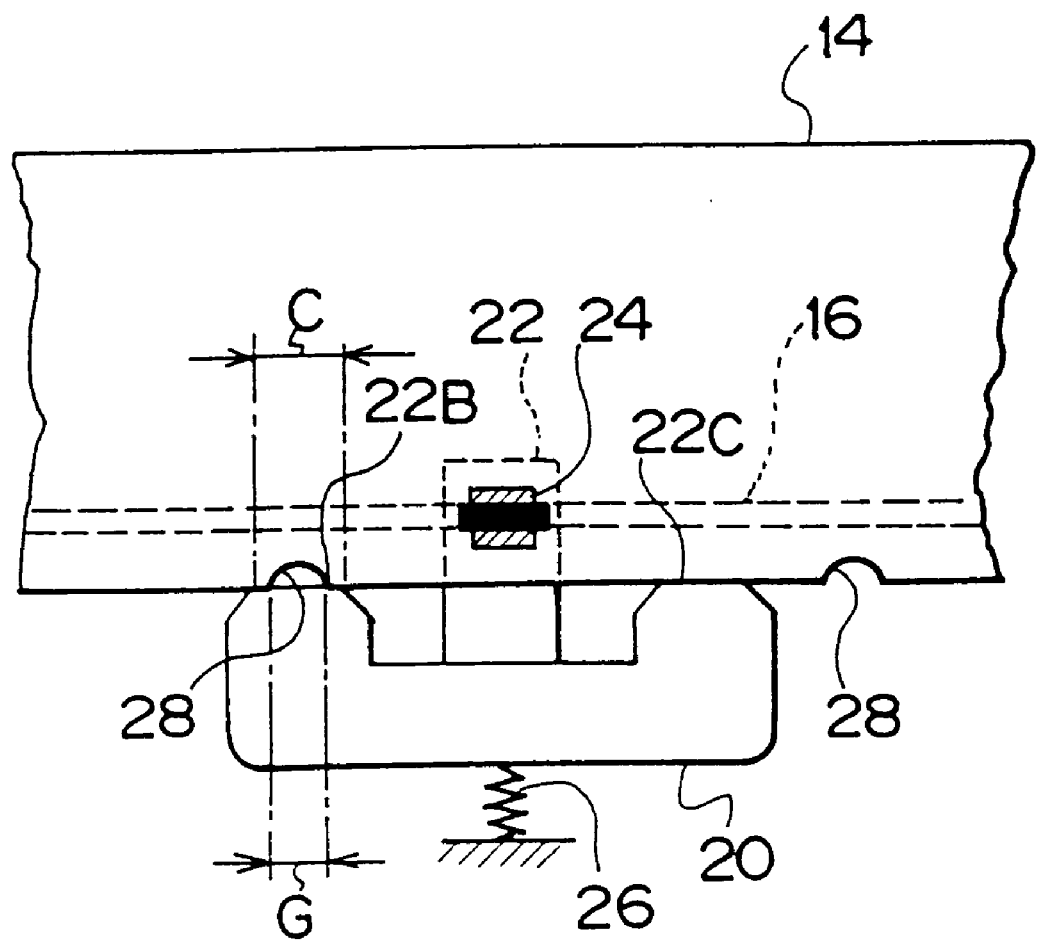
FIG. 3 is a plan view illustrating an alternative example of a guide plate of the first embodiment.

Meanwhile, in the first embodiment, the guide plate 20 is rectangular in shape and a single edge following surface 22A is provided. However, as shown in FIG. 3, the guide plate 20 may be formed into a substantially C-shaped configuration by causing both end portions of the guide plate 20, to be bent substantially at right angles in the direction of the side edge portion of the film 14 so that the two bent leading end surfaces may serve as a pair of edge following surfaces 22B, 22C.

In this case, it suffices that the widthwise dimension C of each edge following surface 22B, 22C, which is disposed along a direction in which the film is conveyed, is formed larger than the dimension G of the opening of the notch 28.

(Second Embodiment)

A second embodiment of the present invention will be described below. It should be noted that the same members as those of the first embodiment will be denoted by the same reference numerals, and a description thereof will be omitted.

Figure 4:
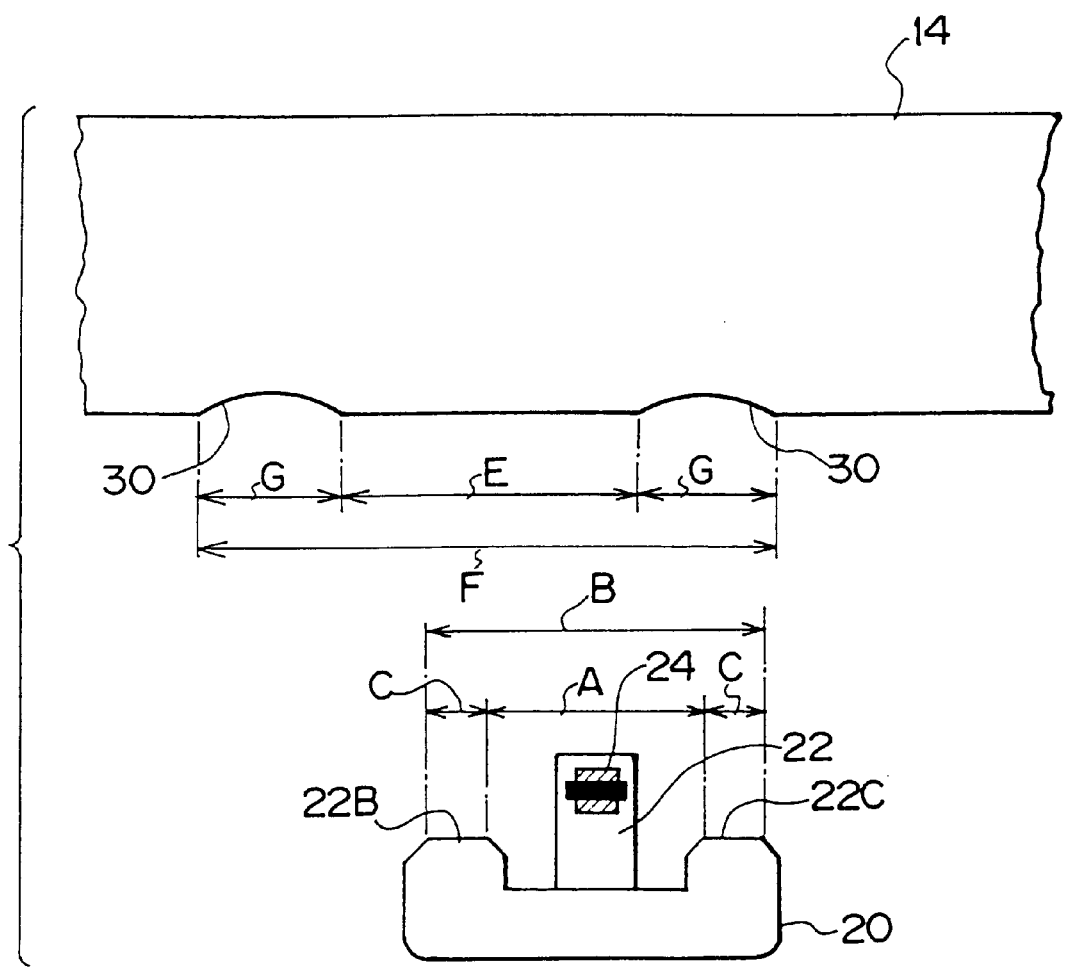
FIG. 4 is a plan view illustrating a dimensional relationship between a film and a guide plate according to a second embodiment.

As shown in FIG. 4, a notch 30 of which dimension G of the opening is relatively large, is formed in the side edge portion of the film 14. Further, the substantially C-shaped guide plate 20 shown in FIG. 3 is used.

When the above-described large notch 30 is provided at predetermined intervals, it suffices that at least one of the pair of edge following surfaces 22B, 22C may slide on the side edge portion of the film outside of the notch 30 (the guide plate 20 is adapted so as not to be rotatable), thereby allowing the guide plate 20 to move across the notch 30 in a straight line.

Figure 5A:
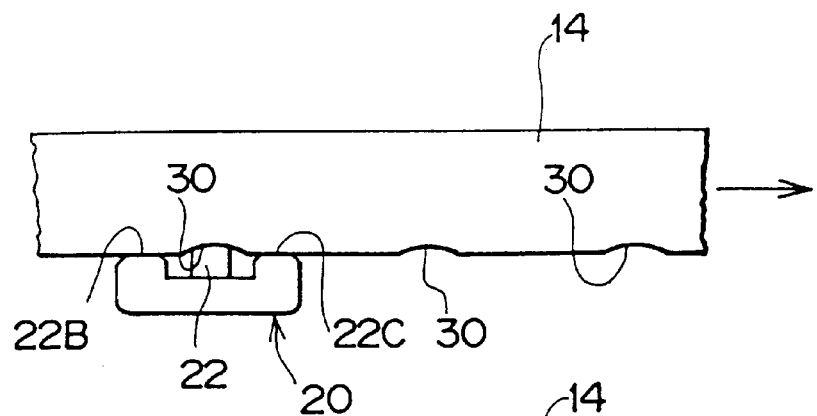
FIG. 5A and FIG. 5B are plan views respectively showing a relative positional relationship between the film and the guide plate according to the second embodiment.
Figure 5B:
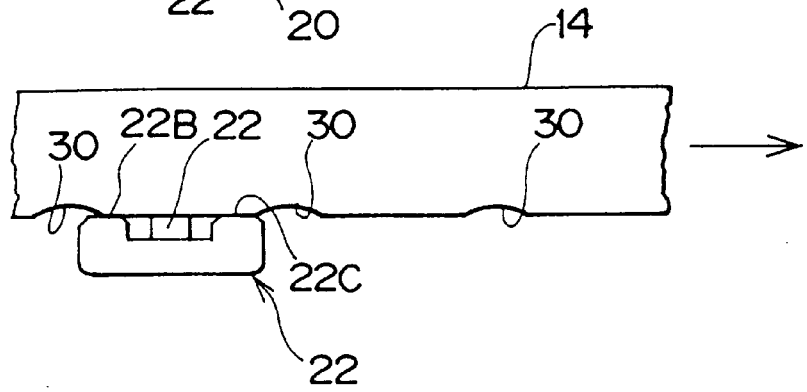

The relative positional relationship between the film 14 and the guide plate 20 and the dimension of the notch 30 may be determined such that the pair of edge following surfaces 22B, 22C are brought into a state of straddling one notch 30 as shown in FIG. 5A, and the pair of edge following surfaces 22B, 22C are both brought into a state of being positioned on a straight-line portion between the two notches 30 as shown in FIG. 5B.

As shown in FIG. 4, assuming that the dimension of the opening of the notch 30 is represented by G, the straight-line portion between the notches 30 is represented by E, the sum of the above-described dimensions G and E is F. The widthwise dimension of each edge following surface 22B, 22C of the guide plate 20 is represented by C. The distance between the pair of edge following surfaces 22B, 22C is represented by A. The sum of the above-described dimensions C and A is B. These dimensions are respectively set such that the relations described below may be concluded.

$$B>G \text{ and } A<E \qquad (1)$$

Next, an operation of the second embodiment will be described.

When the relation B>G of the above-described condition (1) was concluded, the pair of edge following surfaces 22B, 22C reliably straddle one notch 30 so as to slide on the straight-line portion of the film 14 (see FIG. 5A). When the relation A<E of the condition (1) was concluded, the pair of edge following surfaces 22B, 22C can be positioned in such a manner as to correspond to the straight-line portion of the film 14 between two notches 30 (see FIG. 5B). Further, when one of the pair of edge following surfaces 22B, 22C faces the notch 30, the other edge following surface inevitably corresponds to the straight-line portion of the film side edge portion.

For this reason, the guide plate 20 can follow the film 14 merely by the amount of film displacement in accordance with the fishtail movement of the film 14 regardless of whether notches 30 are formed in the film 14 or not.

(Third Embodiment)

A third embodiment of the present invention will be described below. It should be noted that the same members as those of the first embodiment will be denoted by the same reference numerals, and a description thereof will be omitted.

Figure 6:
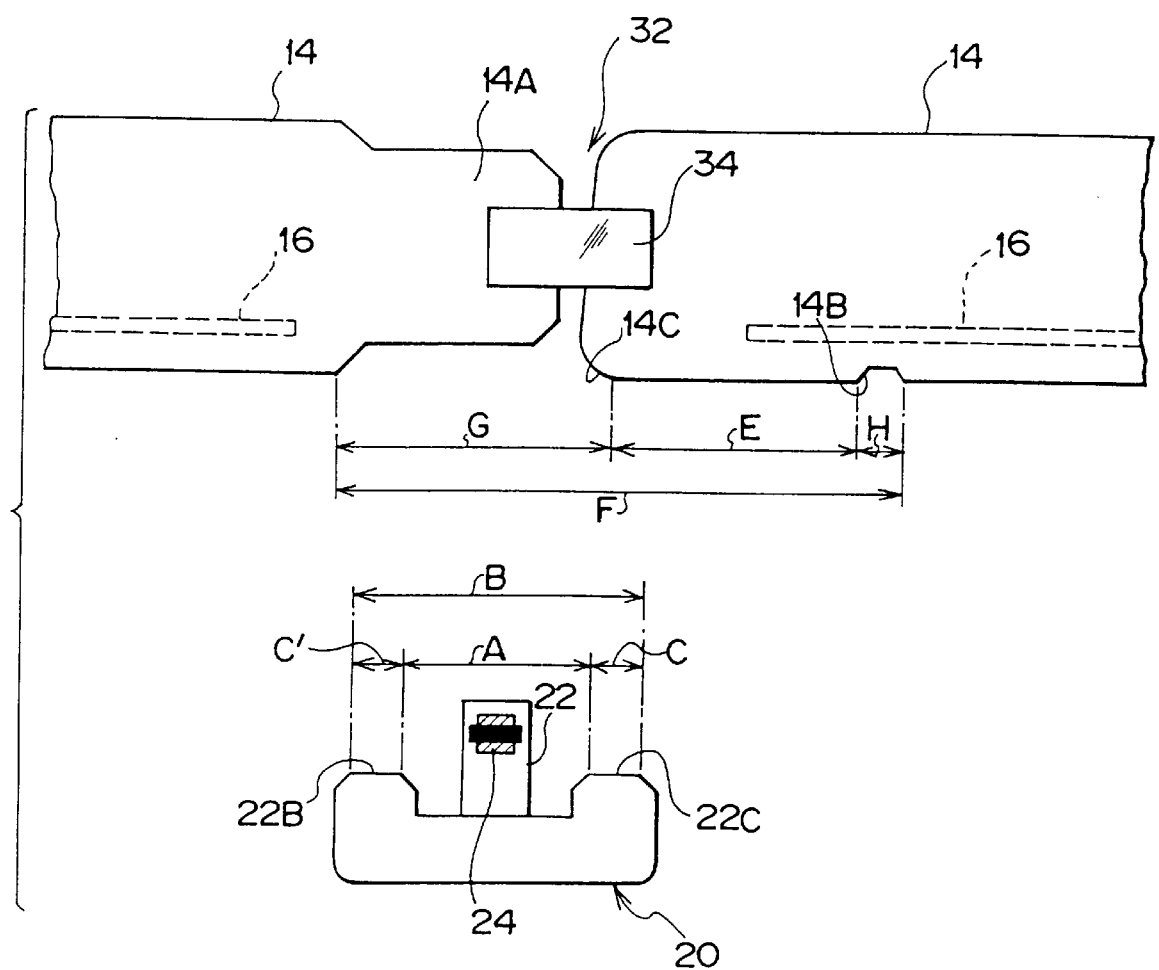
FIG. 6 is a plan view illustrating a dimensional relationship between a film and a guide plate according to a third embodiment.

In FIG. 6, a joint portion 32 for connecting two films 14 (a trailing end portion of a film 14 on the left side and a leading end portion of a film 14 on the right side). These two films 14 are connected by sticking a splicing tape 34 to the two films 14 in such a manner that the splicing tape 34 strides across a gap between the two films 14.

The trailing end portion of the film 14 disposed on the left side of FIG. 6 is narrowed in its transverse dimension. Namely, the trailing end portion is used as a tongue portion 14A for winding the film onto a reel within an unillustrated cartridge. Meanwhile, a notch portion 14B characteristic of the leading end portion is formed in the leading end portion of the film 14 disposed on the right side of FIG. 6. The notch portion 14B is used as a hang-up portion when the film 14 is pulled out of the cartridge. Further, each corner of the leading end portion of the film 14 is cut obliquely and a circular chamfer portion (R) 14C is formed.

In this way, various stepped portions, i.e., concave portions, are formed in the joint portion 32 of the film 14. Since the recording track 16 is provided in the joint portion 32, the magnetic head 24 needs to follow the film 14.

Accordingly, as shown in FIG. 6, the guide plate 20 is formed such that any one of the relations (1) to (3) described below is met assuming that the distance from the left-side starting position of the tongue portion 14A of the film 14 to the boundary between the chamfer portion 14C and the portion of the film having a linear side edge is represented by G, the distance from, on the one hand, the boundary between the chamfer portion 14C and the portion of the film having a linear side edge, on the other hand, the edge portion of the notch portion 14B which edge portion is near the film leading end portion is represented by E, the dimension of the opening between the edges of the notch portion 14B is represented by H, the widthwise dimension of each of edge following surfaces 22B, 22C of the guide plate 20 is represented by C, the distance between the edge following surfaces 22B, 22C is represented by A, and the sum of the above-described dimensions C and A is B.

$$B > F \tag{1}$$

$$B > G \text{ and } C > H \tag{2}$$

$$B > G \text{ and } A < E \tag{3}$$

Next, an operation of the third embodiment will be described.

When the above-described condition (1) is met since the pair of edge following surfaces 22B, 22C can completely straddle the joint portion 32, at least one of the pair of edge following surfaces 22B, 22C slides on the straight-line portion of the film. As a result, the guide plate 20 is not influenced by the stepped state of the joint portion 32, and the guide plate 20 can follow the film 14.

When the relation B>G of the above-described condition (2) is met the pair of edge following surfaces 22B, 22C can straddle the maximum-wide stepped portion of the joint portion 32. When the relation C>H of the above-described condition (2) is met the edge following surfaces 22B, 22C do not get hung up in a stepped portion (i.e., the notch portion 14B) of minimum width in the joint portion 32.

For this reason, since at least one of the pair of edge following surfaces 22B, 22C slides on the straight-line portion of the film, the guide plate 20 can follow the film 14 without being influenced by the stepped state of the joint portion 32.

When the relation B>G of the above-described condition (3) is met the same result as that of the condition (2) is obtained. When the relation A<E of the condition (3) is met the pair of edge following surfaces 22B, 22C respectively must not correspond to the stepped portions of the maximum width and the minimum width at the same time.

Accordingly, since at least one of the pair of edge following surfaces 223, 22C slides on the straight-line portion of the film, the guide plate 20 can follow the film 14 without being influenced by the stepped state of the joint portion 32.

(Fourth Embodiment)

A fourth embodiment of the present invention will be described below. It should be noted that the same members as those of the first and third embodiments will be denoted by the same reference numerals, and a description thereof will be omitted.

Figure 7:
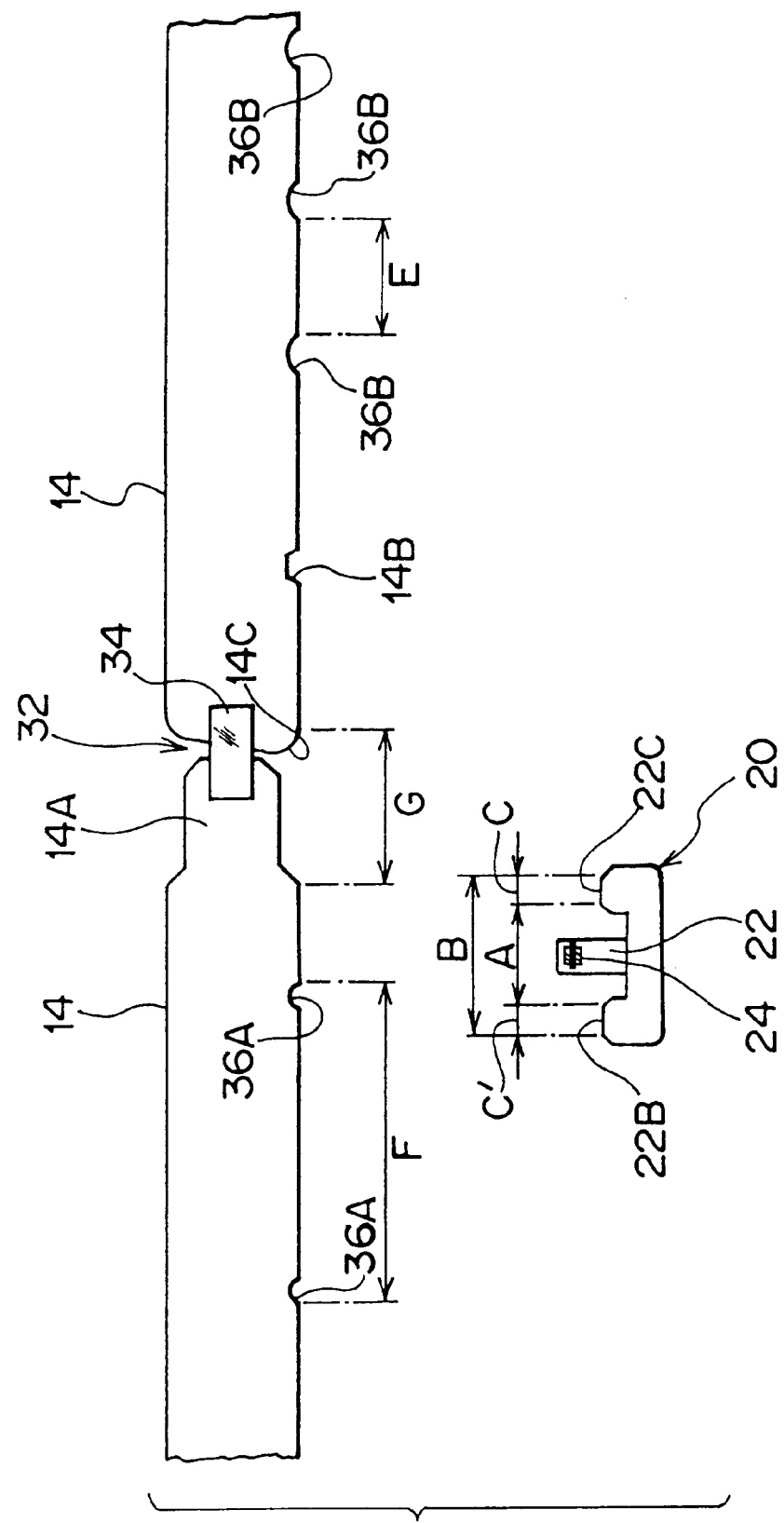
FIG. 7 is a plan view illustrating a dimensional relationship between a film and a guide plate according to a fourth embodiment.
Figure 8:
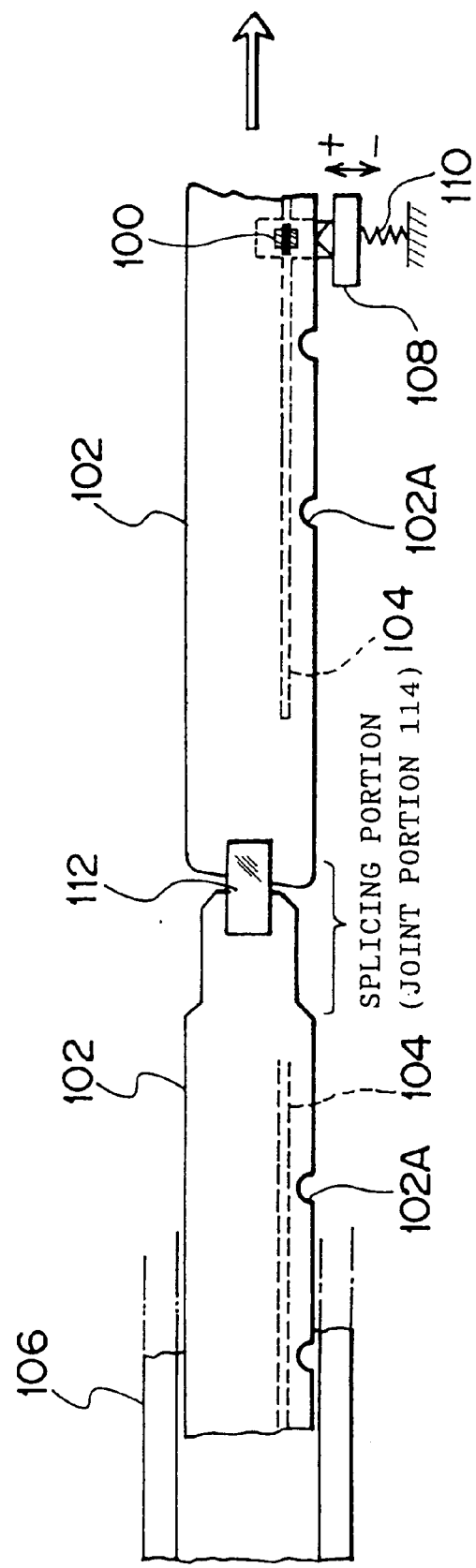
FIG. 8 is a plan view illustrating a portion of a conventional film conveying apparatus.
Figure 9:
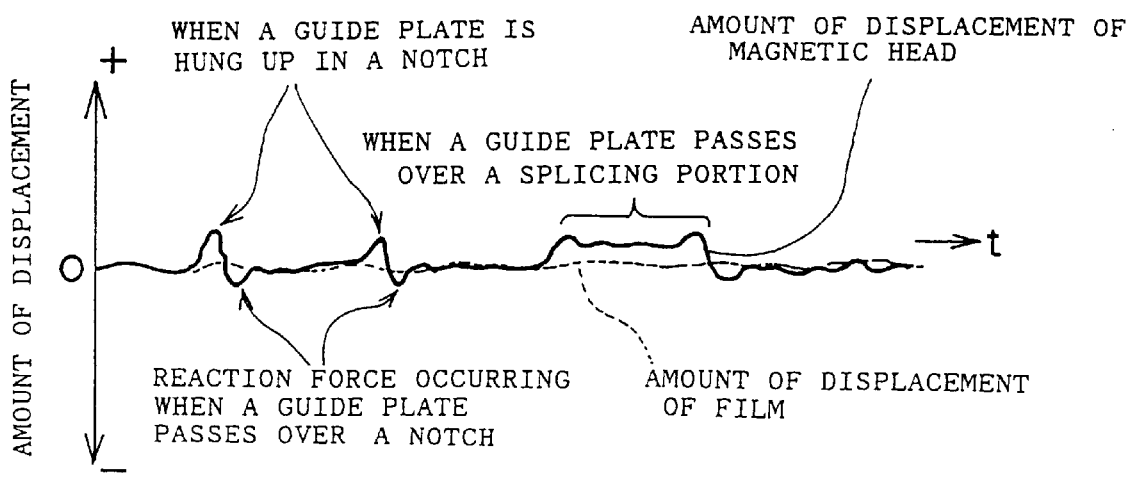
FIG. 9 is a characteristic view illustrating a change in the amount of displacement of a conventional magnetic track.

FIG. 7 shows two films 14 connected to each other by splicing tape 34. These films 14 are respectively provided with notches 36A and notches 36B, whose intervals and shapes are different.

Even when the two films 14 having different intervals between the notches are connected to each other, the magnetic head 24 must be able to follow the film 14 at any place on the film 14 including the joint portion 32 disposed between the films 14.

Accordingly, as shown in FIG. 6, the guide plate 20 is formed such that any one of the relations described below is met assuming that the distance from one notch 36A in the film 14 disposed on the left side in FIG. 7 to another notch 36A thereof, including open widthwise dimensions of the two notches 36A (for example, the distance between the left edge portion of the notch 36A on the left and the right edge portion of the notch 36A on the right in FIG. 1) is represented by F (which is the greatest distance among all the intervals between stepped portions), the distance from the left-side starting position of the tongue portion 14A to the boundary of the chamfer portion 14C and the portion of the film having a linear side edge is represented by G (which is the greatest widthwise dimension along the direction in which the film 14 is conveyed, among all the stepped portions), the distance between each notch 36B in the film 14 positioned on the right side in FIG. 7 is represented by E (which is the shortest distance among all the intervals between stepped portions), the widthwise dimension, along the direction in which the film 14 is conveyed, of each of the pair of edge following surfaces 22B, 22C of the guide plate 20 is represented by C, the distance between the edge following surfaces 22B, 22C is represented by A, and the sum of the above-described dimensions C and A is B.

$$C > G \tag{1}$$

$$B > G \text{ and } A < E \tag{2}$$

$$B > F \tag{3}$$

Next, an operation of the fourth embodiment will be described.

When the above-described condition (1) is met there is no possibility that any one of the pair of edge following surfaces 22B, 22C might be hung up in the stepped portion having the maximum dimension in the direction in which the film 14 is conveyed. As a result, the guide plate 20 is not influenced by the stepped portion and can follow the film 14.

When the relation B>G in the above-described condition (2) is met the pair of edge following surfaces 22B, 22C can straddle the stepped portion in the joint portion 32, which has the maximum dimension in the film-conveying direction. When the relation A<E of the condition (2) is met the pair of edge following surfaces 22B, 22C can be positioned within the shortest distance between the notches 36B. For this reason, at least one of the pair of edge following surfaces 22B, 22C slides on the straight-line portion of the film, so that the guide plate 20 can follow the film 14 without being influenced by the stepped state of the joint portion 32.

When the above-described condition (3) was concluded, the pair of edge following surfaces 22B, 22C can be positioned at a stance in which the distance therebetween is greater than the greatest distance from one stepped portion (notch 36A) to another. For this reason, the guide plate 20 can follow the film 14 without being influenced by stepped portions including the joint portion 32.

Meanwhile, in each of the above-described embodiments, the recording track 16 formed of a magnetic body is provided as the magnetic recording portion and the magnetic head 24 is used as the recording/reproducing means. However, a light-sensitive band may be used as an optical recording portion and a light source may be used as the recording/reproducing means.

On the other hand, as an information recording and reproducing apparatus which prevents a magnetic head from deviating from a track, the following apparatuses are illustrated.

Figure 10:
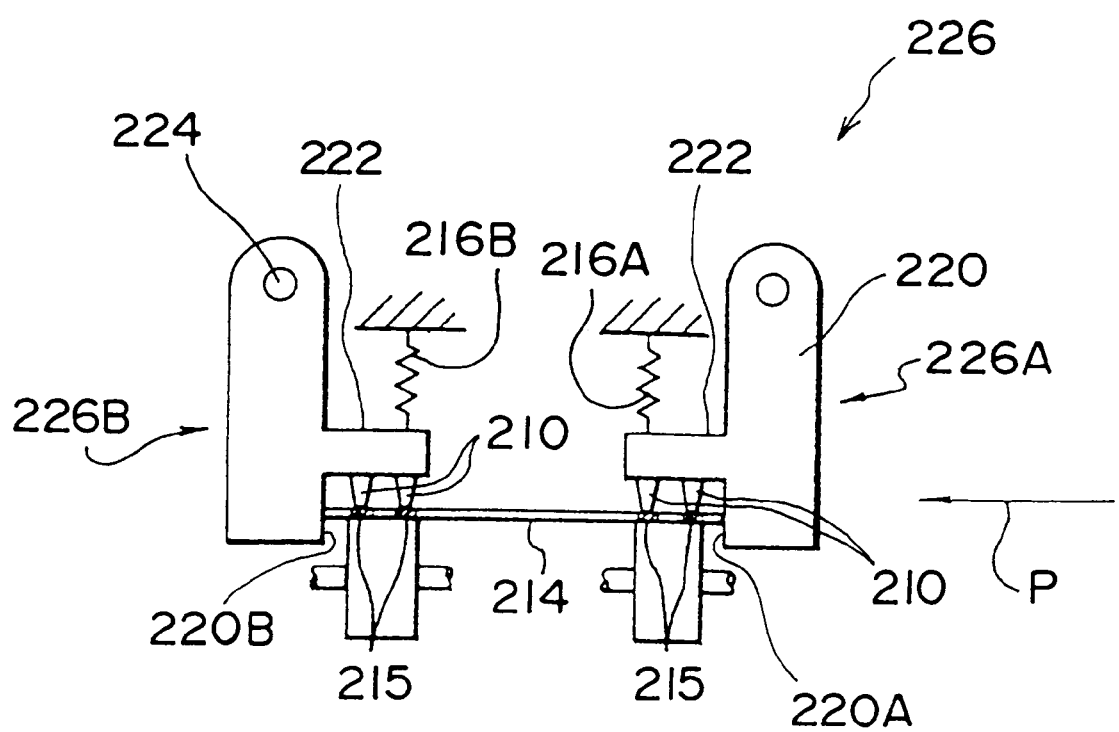
FIG. 10 is a side view of a first example of an information recording and reproducing apparatus which prevents a magnetic head from deviating from a track, which illustrates a state in which a film is conveyed.

As a first example, an information recording and reproducing apparatus 226 is shown in FIG. 10. The information recording and reproducing apparatus 226 is adapted to read and/or write information by causing the magnetic head 210 to slide on a track 215 formed on both sides of the film 214 in the transverse direction thereof. The upper end portion of the guide portion 220 is supported by a pin 224 in such a manner as to be swingable. One end of each of the extension coil springs 216A, 216B is fixed to an upper surface of the mounting portion 222, and another end is fixed on a film transport path. The extension coil springs 216A, 216B respectively urge a guide surface 220A of a supporting member 226A and a guide surface 220B of a supporting member 226B in the direction of arrow P and in the direction opposite to the direction of arrow P. Accordingly, the pair of supporting members 226A, 226B follow the film 214 swinging in the transverse direction of the film so as to be swingable in the direction of arrow P and the direction opposite to the direction of the arrow P. As a result, the magnetic head 210 does not deviate from the track 215.

Figure 11:
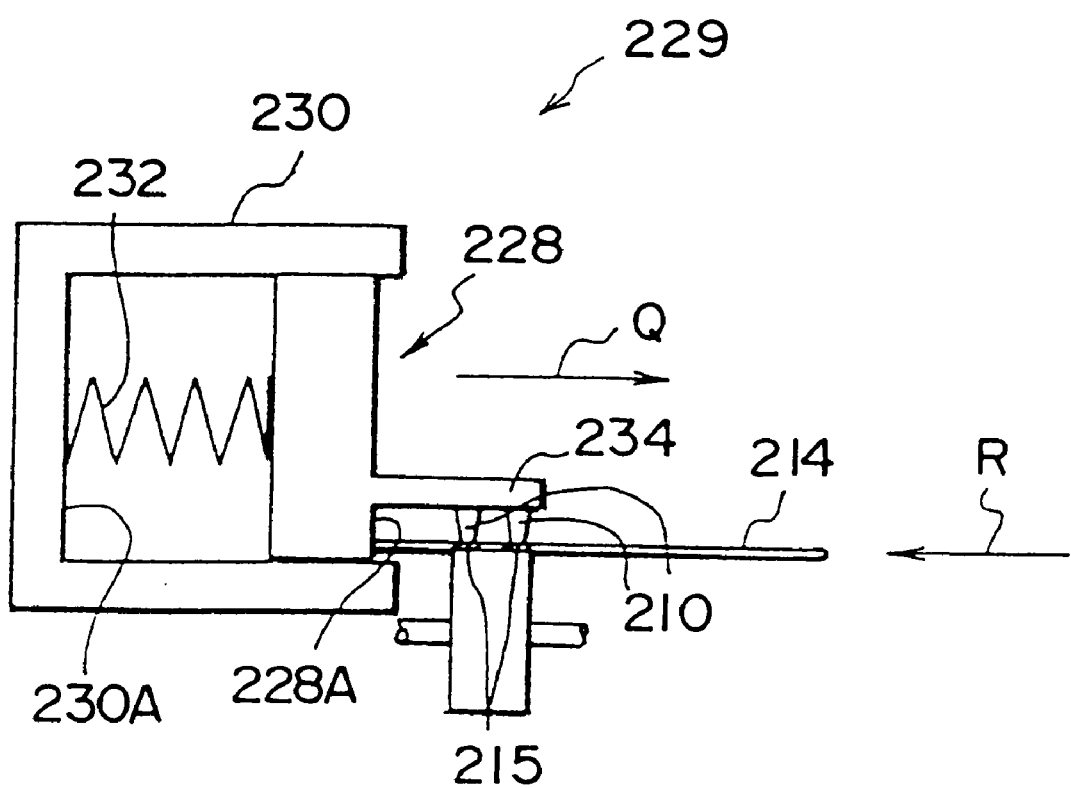
FIG. 11 is a side view of a second example of an information recording and reproducing apparatus which prevents a magnetic head from deviating from a track and which illustrates a state in which a film is conveyed.

As a second example, an information recording and reproducing apparatus 229 is shown in FIG. 11. A supporting member 228 is accommodated in a housing 230 in such a manner as to be capable of entering into and coming out of the housing 230. A compression coil spring 232 provided on a bottom surface 230A of the housing 230 urges the supporting member 228 in the direction of arrow Q. The supporting member 228 includes a guide surface 228A and a mounting portion 234 for a magnetic head 210 and is adapted to follow the film 214 swinging in a transverse direction of the film and to be movable in a direction of an arrow R and a direction opposite to that of arrow R. Accordingly, when the film 214 swings in the direction of arrow R, the side edge of the film 214 presses the guide surface 228A and moves the supporting member 228 in the direction of arrow R against the urging force of the compression coil spring 232. For this reason, since the magnetic head 210 also moves in the direction of arrow R, it does not deviate from a track. When the film 214 swings in the direction of arrow Q, the supporting member 228 moves in the direction of arrow Q by the urging force of the compression coil spring 232. As a result, the state in which the side edge of the film 214 and the guide surface 228A abuts each other is maintained. Accordingly, the magnetic head 210 moves in the direction of arrow Q while holding the positional relationship with respect to the track 215, thereby resulting in no deviation of the magnetic head 210 from the track 215.

Figure 12:
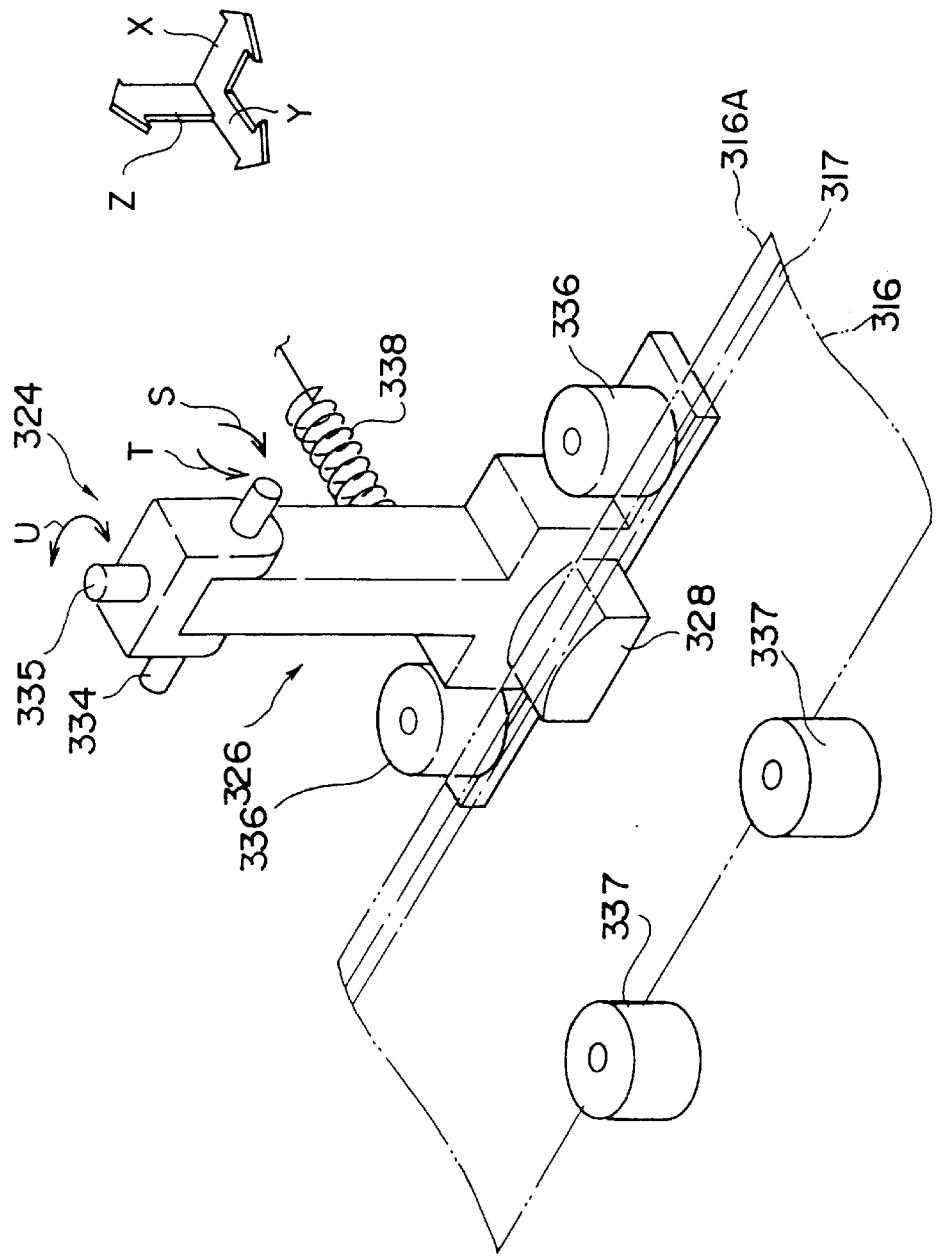
FIG. 12 is a perspective view of a third example of an information recording and reproducing apparatus which prevents a magnetic head from deviating from a track.

As a third example, an information recording and reproducing apparatus 324 is shown in FIG. 12. A negative film 316 is conveyed by an unillustrated conveying roller in the direction of arrow X. When the negative film 316 is conveyed, magnetic information is recorded on a track 317 of the negative film 316 by a magnetic head 328, or recorded information is reproduced. When the negative film 316 fishtails so as to swing in a direction of arrow Y during transport of the negative film 316, the supporting member 326 swings about a supporting pin 334 in the direction of arrow S by an urging force of the compression coil spring 338, and an unillustrated supporting plate which supports a guide roller 337 and also swings in the direction of arrow S. Accordingly, the supporting member 326 is maintained in a state in which a guide roller 336 abuts the negative film 316, and the magnetic head 328 is disposed at the correct position with respect to the transverse direction of the negative film 316. As a result, the magnetic head 328 can contact the track 317 in such a manner that the magnetic head 328 does not deviate from the track, so that correct recording and reproducing of information can be effected. Further, when the negative film 316 fishtails so as to swing in a direction opposite to the direction of the arrow Y during transport of the negative film 316, the side edge portion 316A of the negative film 316 presses the supporting member 326 via the guide rollers 336 and the supporting member 326 is rotated about the supporting pin 334 in the direction of arrow T against the urging force of the compression coil spring 338. Accordingly, the guide roller 336 is held in a state of abutting the negative film 316 and the magnetic head 328 is disposed at the correct position with respect to the transverse direction of the negative film 316. As a result, the magnetic head 328 can contact the track 317 in a state of not deviating from the track, and correct recording and reproducing of information can be effected. Further, a supporting pin 335 is provided so as to project from an upper end portion of the supporting member 326, which is supported so as to be rotatable in the direction of arrow U. Accordingly, in such a manner as described above, the magnetic head 328 is adapted to reliably contact the track 317 by the urging force of the compression coil spring 338 even if the negative film 316 swings in the direction of arrow U.

Figure 13:
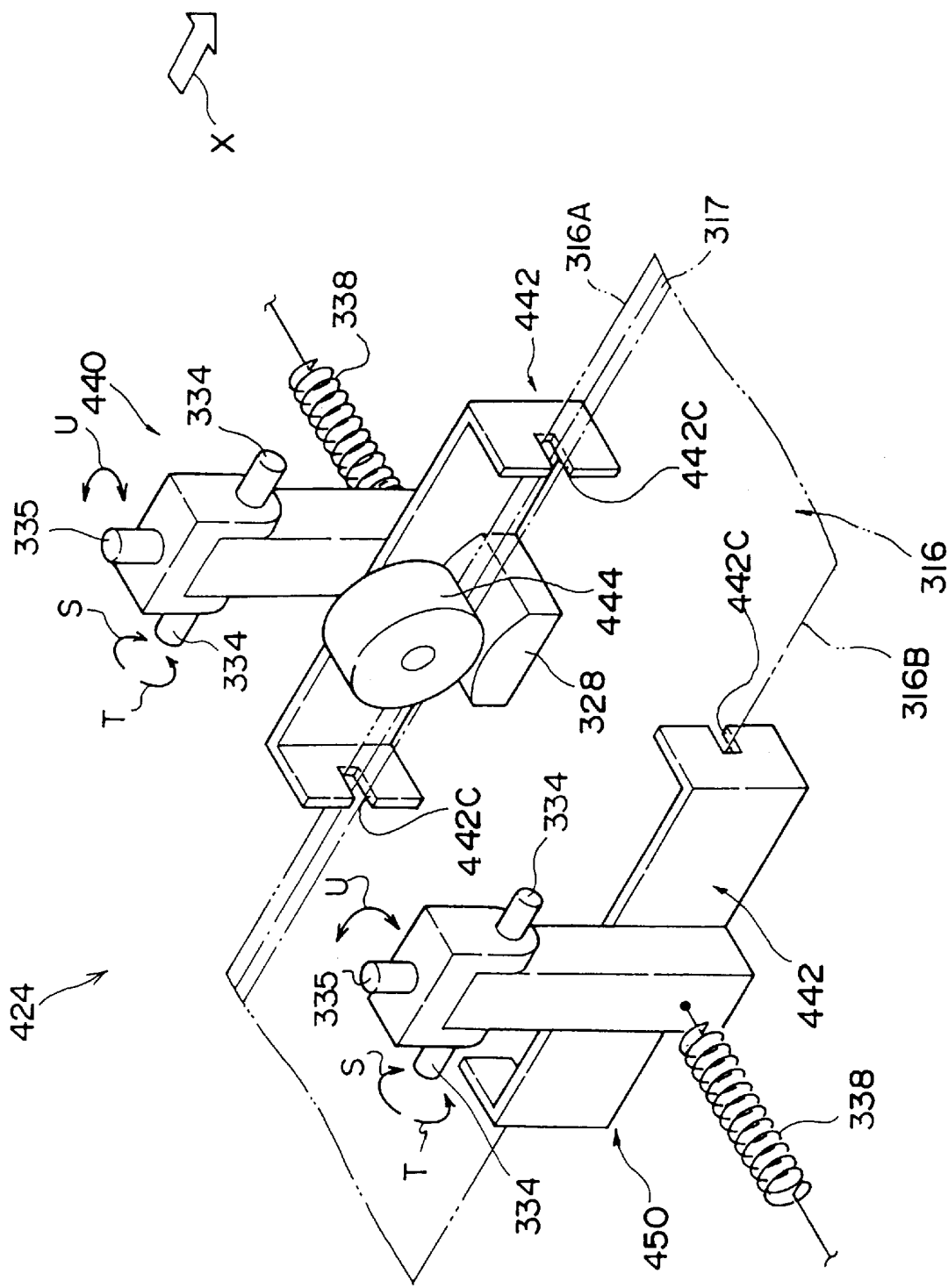
FIG. 13 is a perspective view of a fourth example of an information recording and reproducing apparatus which prevents a magnetic head from deviating from a track.

As a fourth example, an information recording and reproducing apparatus 424 is shown in FIG. 13. It should be noted that the same members as those of the third example will be denoted by the same reference numerals, and a description thereof will be omitted. The negative film 316 is conveyed while being held by supporting members 440 and 450 in a state in which side edge portions 316A, 316B of the negative film 316 are inserted into notches 442C of the supporting members 440 and 450. Even when the negative film 316 fishtails during transport of the negative film 316, the negative film 316 is conveyed in a state of being held by the supporting members 440 and 450 at all times by the urging force of the compression coil spring 338. Further, the negative film 316 is conveyed stably. In addition, since the track 317 of the negative film 316 is pressed against the magnetic head 328 by a pressing roller 444, the contacting property of the track 317 and the magnetic head 328 improves. Further, since the negative film 316 is guided in a state of abutting a guide portion 442 formed of a material having a small coefficient of friction, wear of the guide portion 442 and the negative film 316 and generation of shavings are prevented. Also, the supporting members 440 and 450 are rotated not only in the directions of arrows S and T, but also in the direction of arrow U, and follow the negative film 316 which is fishtailing. Accordingly, not only does the magnetic head 328 also rotate in the directions of arrows S and T so as to prevent the magnetic head 328 from deviating from the track 317, the magnetic head 328 also rotates in the direction of arrow U so as to eliminate deviation of the magnetic head 328 in the fishtail direction, thereby making it possible to effect correct recording and reproducing of information.

Figure 14:
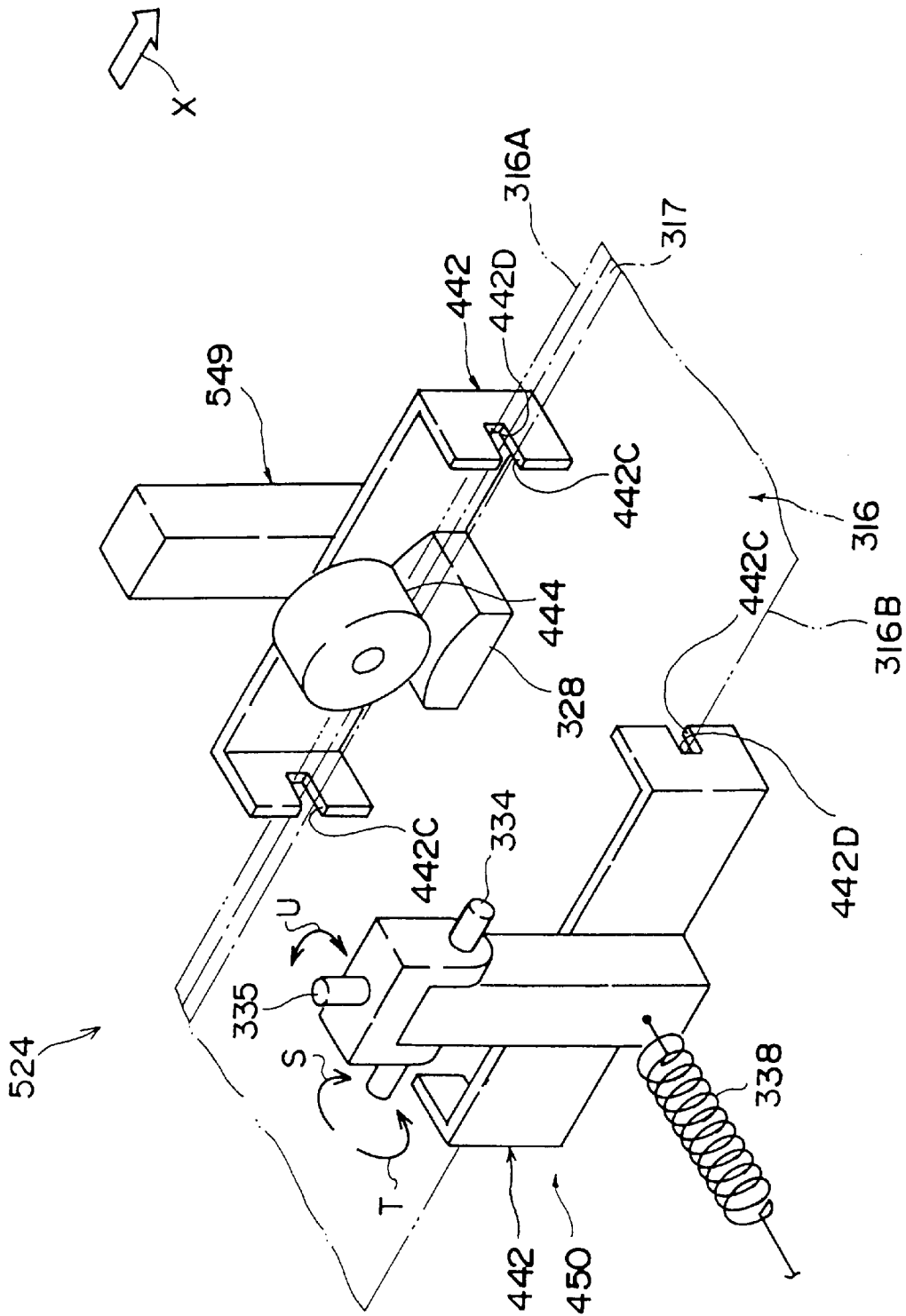
FIG. 14 is a perspective view of a fifth example of an information recording and reproducing apparatus which prevents a magnetic head from deviating from a track.

As a fifth example, an information recording and reproducing apparatus 524 is shown in FIG. 14. It should be noted that the same members as those of the fourth example will be denoted by the same reference numerals, and a description thereof will be omitted. In this fifth example, the supporting member 440 of the fourth example is replaced by a supporting member 549, which is not provided with the supporting pins 334 or the supporting pin 335 both shown in the fourth example and which is fixed to an unillustrated fixing portion of a photographic printer (not shown). In this example, the negative film 316 is conveyed in a state in which the side edge portion 316B of the negative film 316 abuts a bottom wall 442D of the notch 442C of the guide portion 442 in the supporting member 450, and the side edge portion 316A of the negative film 316 abuts a bottom wall 442D of the notch 442C of the guide portion 442 in the supporting member 549. When the negative film 316 is conveyed, the urging force of the compression coil spring 338 is applied to the negative film 316 via the supporting member 450 and the side edge portion 316A is pressed against the bottom wall 442D of the notch 442C of the guide portion 442. For this reason, even if the negative film 316 fishtails, the relative positional relationship between the magnetic head 328 and the track 317 of the negative film 316 is maintained in a fixed state at all times. As a result, information can be correctly recorded on the track 317, or information recorded on the track 317 can be correctly reproduced.

Figure 15:
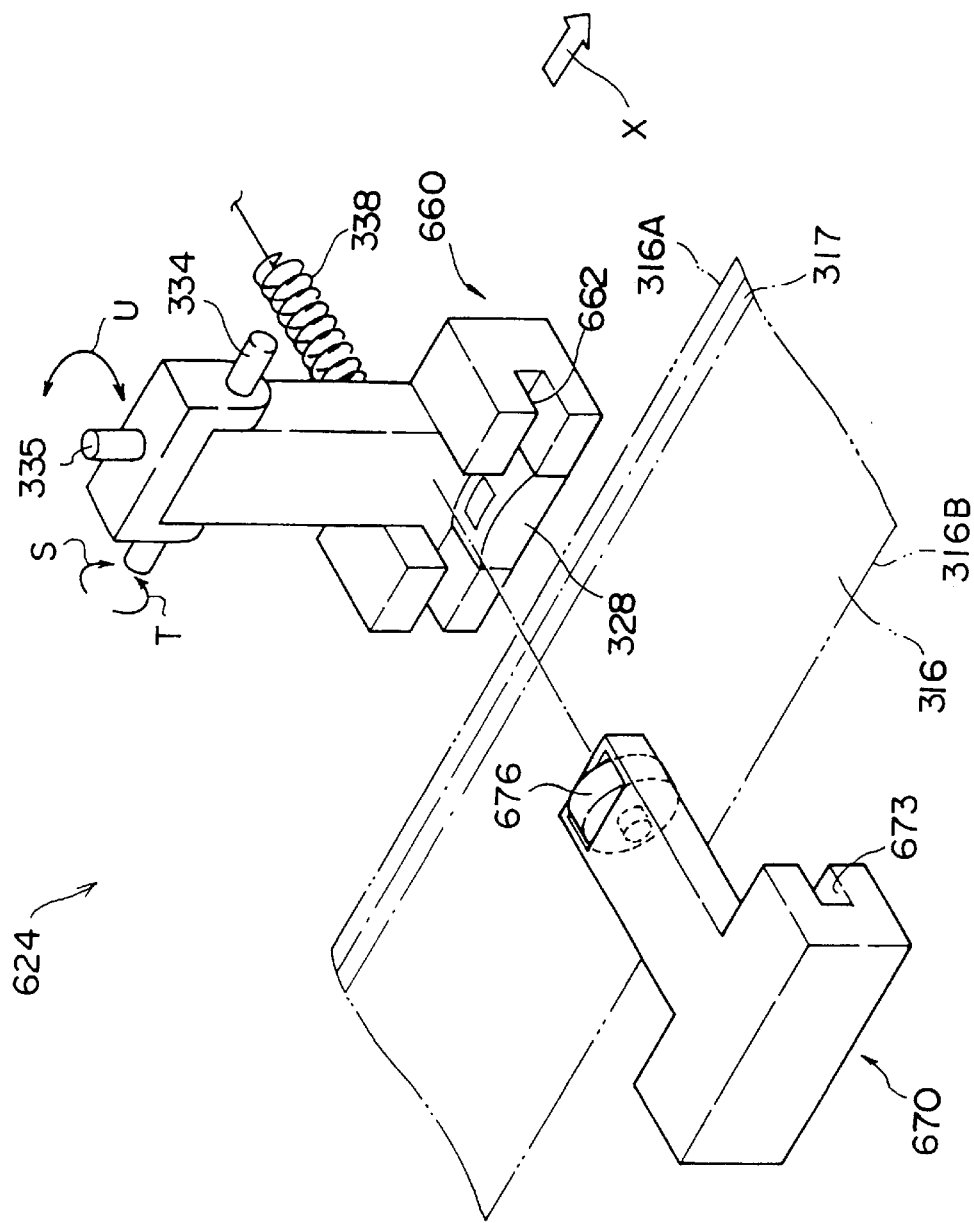
FIG. 15 is a perspective view of a sixth example of an information recording and reproducing apparatus which prevents a magnetic head from deviating from a track.

As a sixth example, an information recording and reproducing apparatus 624 is shown in FIG. 15. It should be noted that the same members as those of the fourth example will be denoted by the same reference numerals, and a description thereof will be omitted. In this sixth example, the negative film 316 is conveyed in a state in which the side edge portions 316A, 316B of the negative film 316 are respectively inserted into concave portions 662, 673 of supporting members 660 and 670. Since recording and reproducing of information by the magnetic head 328 is effected in a state in which the track 317 of the negative film 316 is pressed against the magnetic head 328 by a pressing roller 676, the contacting property of the magnetic head 328 and the track 317 is sufficiently maintained. Accordingly, information can be correctly recorded on the track 317, or information recorded on the track 317 can be correctly reproduced. In addition, in this example, the supporting member 670 to which the pressing roller 676 is fixed is separated from the supporting member 660, and generally, friction between the magnetic head 328 and the negative film 316 is very small. For this reason, even when friction between the pressing roller 676 and the negative film 316 is relatively large, the supporting member 660 can rotate about the supporting pin 334 in each direction of arrows S, T and U. This makes it possible to prevent deviation of the magnetic head 328 from the track 317.

What is claimed is:

1. An information processing apparatus which conveys a film, in which a recording portion is provided, comprising:

information transfer means for transferring said information in at least one of a reading and recording mode;

a guide plate on which said information transfer means is mounted, said guide plate being capable of moving close to or away from a side edge of the film and having one edge following surface which abuts said side edge of the film; and urging means for urging the edge following surface of said guide plate against said side edge of the film and for causing said guide plate to follow the film if the film is fishtailing, a dimension of said edge following surface in a direction in which the film is conveyed being larger than a dimension of the width of openings of concave portions formed in said side edge of the film.

2. An information processing apparatus according to claim 1, wherein said guide plate cannot rotate in a fishtailing direction of said reading/recording means corresponding to said information area.

3. An information processing apparatus which conveys a film having concave portions formed on a side edge and having a recording portion on a surface extending substantially parallel to said side edge for storing information, comprising:

information transfer means for transferring said information in at least one of a reading and recording mode;

a guide plate on which said information transfer means is mounted, said guide plate being capable of moving close to or away from said side edge of the film and having two edge following surfaces which abut said side edge of the film, the dimensions of said two edge following surfaces being based on at least one of the width of said concave portions along said side edge of the film and the distance between said concave portions, so that a straight-line portion of said film slides along at least a portion of at least one of said two edge following surfaces; and urging means for urging the edge following surfaces of said guide plate against said side edge of the film and for causing said guide plate to follow fishtailing movement of the film.

4. An information processing apparatus according to claim 3, wherein said guide plate cannot rotate in a fishtailing direction of said information transfer means corresponding to said recording portion.

5. An information processing apparatus according to claim 3, wherein the dimension of each edge following surface in the direction in which the film is advanced is made larger than the dimension of the width of an opening of each concave portion.

6. An information processing apparatus according to claim 3, wherein the distance between the two edge following surfaces plus the length of the two edge following surfaces in the direction in which the film is conveyed is larger than the width of an opening of one concave portion, and the distance between said two edge following surfaces is shorter than the distance between two adjacent concave portions.

7. An information processing apparatus according to claim 3, wherein the dimension of each of said two edge following surfaces in the direction in which the film is conveyed and the distance between said two edge following surfaces in the direction in which the film is conveyed are respectively determined in accordance with at least one of three conditions, a first concave portion being the largest of all concave portions of said film and a second concave portion being a concave portion adjacent to said first concave portion, said three conditions comprising: (1) a distance from one edge following surface to another edge following surface including the dimensions of said two edge following surfaces is larger than a distance from said first concave portion to said second concave portion, including said first and second concave portions; (2) the distance from one edge following surface to another edge following surface including the dimensions of said two edge following surfaces in the direction in which the film is conveyed is larger than the width of the opening of the first concave portion, and said edge following surface which is positioned on the side of the first concave portion that includes the second concave portion, is larger than the width of an opening of the second concave portion; and (3) the distance from one edge following surface to another edge following surface including the dimensions of said two edge following surfaces in the direction in which the film is conveyed is larger than the width of the opening of the first concave portion, and a distance between said two edge following surfaces is smaller than a distance between the first concave portion and the second concave portion.

8. An information processing apparatus according to claim 3, wherein the dimension of each of said two edge following surfaces in the direction in which the film is conveyed and the distance between said two edge following surfaces in the direction in which the film is conveyed are determined such that at least one of three conditions can be concluded: (1) the dimension of at least one of said two edge following surfaces in the direction in which the film is conveyed is larger than the opening width of a concave portion whose opening width is the largest; (2) the distance from one edge following surface to another edge following surface including the dimensions of said two edge following surfaces in the direction in which the film is conveyed is larger than the opening width of the concave portion whose opening width is the largest, and the distance between said two edge following surfaces is shorter than the distance between adjacent concave portions whose interval has the shortest distance of all concave portions; and (3) the distance from one edge following surface to another edge following surface including the dimensions of said two edge following surfaces in the direction in which the film is conveyed is larger than the distance from one of adjacent concave portions whose interval has the longest distance of all concave portions, to the other one of the adjacent concave portions including the widthwise dimensions of the adjacent concave portions.

* * * * *